United States Patent
Lynch et al.

(10) Patent No.: US 6,871,495 B2
(45) Date of Patent: Mar. 29, 2005

(54) THERMAL CYCLE ENGINE BOOST BRIDGE POWER INTERFACE

(75) Inventors: Thomas H. Lynch, Chatsworth, CA (US); Brian Koch, Woodland Hills, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/431,690

(22) Filed: May 8, 2003

(65) Prior Publication Data

US 2004/0221576 A1 Nov. 11, 2004

(51) Int. Cl.[7] .............................................. F01B 29/10
(52) U.S. Cl. ............................ 60/522; 60/524; 60/517
(58) Field of Search .......................... 60/517, 520, 522, 60/524

(56) References Cited

U.S. PATENT DOCUMENTS

| | | | | |
|---|---|---|---|---|
| 4,454,426 A | * | 6/1984 | Benson | 290/1 R |
| 4,664,685 A | * | 5/1987 | Young | 62/6 |
| 5,875,863 A | * | 3/1999 | Jarvis et al. | 180/65.4 |
| 6,050,092 A | * | 4/2000 | Genstler et al. | 60/520 |
| 6,094,912 A | * | 8/2000 | Williford | 60/520 |
| 2002/0121816 A1 | * | 9/2002 | Qiu et al. | 310/51 |

* cited by examiner

*Primary Examiner*—Hoang Nguyen
(74) *Attorney, Agent, or Firm*—Harness Dickey & Pierce P.L.C.

(57) ABSTRACT

A system and method for controlling a thermal dynamic cycle engine, such as a Stirling engine. The system includes a controller able to execute a program to alter certain aspects of the system to provide for a maximum power transfer and substantially stall free start up of the thermal dynamic cycle engine. Generally the controller is able to alter the current load to achieve a selected stroke length, pattern or temperature of a heater head of the engine. The system allows for generally stall free start-up and continuous control for maximum power (with maximum power factor) transfer from the thermal cycle engine or the associated alternator.

10 Claims, 7 Drawing Sheets

THERMAL CYCLE ENGINE BOOST BRIDGE POWER INTERFACE

FIELD OF INVENTION

The present invention relates generally to control systems for mechanical engines; and particularly to a control system for use in a thermal engine with an alternator.

BACKGROUND OF THE INVENTION

It is generally known to provide an engine that can be powered by various non-chemical and mechanical means. For example, thermal differences may be used to power an engine to provide the thermal dynamic sources producing mechanical and electrical power through an alternator. The thermal dynamic engines include various thermal dynamic cycles which are harnessed to provide the mechanical energy for various engines. Various cycles include Stirling cycles, brayton cycles, and rankine cycles. These various cycles can be employed in engines using the same or similar name as the engine.

Generally, each of these engines provide for producing energy from one of the related thermal dynamic cycles. The thermal dynamic cycles and the related engines require a differential in thermal energy to create the mechanical and electrical energy from the engine. Nevertheless, controlling and making efficient various engines of the thermal dynamic cycles is difficult and requires precise treating and operation.

For example, a Stirling cycle engine is a thermal energy to a mechanical energy conversion device that uses a piston assembly to divide a fixed amount of gas between at least two chambers. The chambers are otherwise connected by a gaseous fluid passage equipped with a heat source, recuperation, and heat sink exchangers. The piston assembly has at least two piston heads that are separated and act on both chambers simultaneously through mutual coupling. As the volume in one chamber is increased, the volume in the other volume decreases and vice versa, although not strictly to the same degree since one of the piston heads may have a greater area than the other piston head by design. The movement of the piston assembly in either direction creates an elevation of pressure in the chamber that experiences a decrease in volume while the other chamber experiences an increase in volume and decrease in pressure. The pressure differential across the two chambers decelerates the pistons, and causes a flow of gas from one chamber to the other, through the connecting fluid passage with its heat exchangers. The heat exchangers tend to either amplify or accentuate the gas volume flowing through them, depending on whether the gas is either heating or cooling as it flows through the fluid exchange. The fluid exchange, also a regenerator heat exchanger, stores heat from the hot end gas as it flows to the cool end. Likewise the regenerator gives up heat to the cooler gas coming from the cold end. This improves the efficiency of the thermal cycle.

The character of the piston assembly as a finite massive moving object now comes into play according to the laws of motion and momentum. The piston will overshoot the point at which the pressure forces across the piston are in balance. Up to that point, the piston has had an accelerating pressure differential force that charges it with kinetic energy of motion. Once the net forces on the piston balance, the acceleration ceases, but the piston moves on at its maximum speed. Soon the pressure differential reverses and the piston decelerates, transferring its kinetic energy of motion into gas pressure/volume energy in the chamber toward which the piston has been moving up to this point. The increased pressure in the chamber now accelerates the piston in the opposite direction to the point where it reaches its maximum velocity in the opposite direction at the force balance point, and then decelerates as an increasing pressure differential builds in the other chamber. Once again, the piston stops, reverses direction, and repeats the process anew. This is a case of periodic motion as the energy is passed from the form of kinetic energy in the piston assembly to net pressure/volume energy in the chambers.

The periodic motion tends to be damped by small irreversibilities, especially the gas that is pumped back and forth from one chamber to the other through the fluid passage. This is the normal case for a Stirling engine in an isothermal state. However, when it is thermally linked to hot source and cool sink reservoirs at the source and sink heat exchangers respectively, the gas flowing into one of the chambers is heated while the gas flowing into the chamber on the other side is cooled. In this way, a given mass of pressurized cool gas sent to the hot chamber is heated and amplified in volume to a sizable shove. Conversely, a given mass of hot gas leaving the hot side chamber is reduced in volume as it is cooled by passage through the heat exchangers, and the cooled gas push in the cool side chamber is thereby attenuated dramatically due to the reduced volumetric flow of the cooler gas. Thereby, a change in the piston position, and its affects on gas temperature and pressure within the Stirling cycle engine, cause portions of the hot reservoir thermal energy to turn into periodic mechanical piston energy and gas pressure/volume energy, and the remaining thermal energy to flow to the cool reservoir in periodic fashion.

The compressible gas within the two chambers and the piston moving between those chambers form a spring-mass system that exhibit a natural frequency. Similarly, the motion of gas between the two chambers has its own natural frequency of a lower order. The conversion of thermal energy to mechanical within this system would cause such a system have successively higher amplitudes until mechanical interference or some other means of removing the energy appears. For many commercial Stirling cycle heat engine systems, a power piston operating at the same frequency, but out of phase with heat engine piston, is used to remove the excess mechanical energy and convert it into useful work.

One way to produce this energy conversion is to use the time varying position of the power piston to produce a time varying magnetic flux in an electrical conductor. This produces an electromotive potential which can be consumed locally, or remotely over transmission lines, by connection to an electrical appliance such as a motor, battery charger, or heater. Commonly, this is done by using the power piston to drive an alternator mover through a mechanical link. The alternator mover is what converts a time varying position within the alternator into time varying magnetic flux in the alternator electrical conductor(s).

Stirling cycle engines can be designed and tuned for optimal efficiency at various different temperatures for the source heat exchanger. Nevertheless, once a Stirling cycle engine is tuned or optimized for particular operating conditions its efficiency dramatically decreases when these optimum conditions are not maintained. If the concentrated sunlight entering the absorber cavity varies slightly, the efficiency of the single Stirling cycle engine can be compromised. Such variations can occur when only a slight haze or foggy condition exists between the concentrator and the sun. Moreover, time of day and seasonal variations can cause the sunlight to travel through more or less atmosphere and effect the insolation, thereby adversely affecting the concentrated solar power level to a value that is not consistent with operating the Stirling cycle engine at its optimum efficiency.

When the insolation becomes too low, the Stirling engine overcools the thermal cavity. At this point, the temperature of the thermal cavity is below the design temperature of the Stirling engine. This will result in a reduction in the heater head temperature causing the engine to operate at a lower efficiency point. Although, the design of the Stirling engine can be modified by adjusting the stroke length to partially compensate for this, the Stirling engine still may not operate at optimum or designed conditions. Therefore, over a long period of time, this inefficiency can have a significant impact on the life cycle cost of the units of energy produced.

It is desirable to provide a system and method that can automatically measure and tune a thermal dynamic engine, for example a Stirling cycle engine, to produce an optimal operation of the engine. Moreover, the system may diagnose various inefficiencies that are created over the life of the engine and can compensate for such inefficiencies to alter the operation of the Stirling engine to provide for an optimal energy transfer from the Stirling cycle engine. Moreover, it is desirable to provide a system which can finally control the Stirling cycle engine to provide for optimal power transfer over various portions of the life cycle, such as start-up and maintenance of the Stirling cycle engine. Also, the reduction of heat flux to the hot end reduces the temperature and available output power. By reducing the stroke of the Stirling, the power transfer is reduced and the hot end temperature will rise, improving the efficiency by maintaining the optimal or tuned temperature of the engine.

SUMMARY OF THE INVENTION

The present invention is directed to a system and method for controlling a thermal dynamic cycle engine in optimal power transfer, with a maximum power factor, over varying life portions of the thermal dynamic cycle engine. The system generally operates to sense various portions and loads on the engine and provides for an optimal load, EMF, and various other physical attributes to provide for an optimal power transfer from the thermal dynamic cycle engine to a collection source. Generally, the system provides a plurality of load and sensing components in conjunction with a processor to process various information from the sensors to determine the available power. In addition, the system provides for monitoring the life cycle of the thermal dynamic engine to provide for varying loads and generated a pseudo "Vemf" current source to provide for the optimal stroke of the thermal dynamic cycle engine and power transfer over the various life portions of the engine.

According to a first embodiment of the invention, a system for controlling a thermal cycle engine powering an alternator to produce a power transfer is disclosed. The system includes a microprocessor able to execute a set of instructions. The system further concludes a $V_{emf}$ determining system for determining a $V_{emf}$ of the thermal cycle engine and an error amplifying module. The processor is able to control the error amplifying module to provide a programmed current load to the alternator to achieve a substantially maximum power transfer from the alternator.

According to a second embodiment of the invention a system is provided for producing electrical power. This system generally includes a thermal cycle engine and an alternator operably coupled to the thermal cycle engine. A load consumes electrical power produced by the alternator for various uses. A controller controls at least one of the thermal cycle engines in the alternator to provide a power transfer to the load. The controller is able to control at least a stroke length of the alternator or the thermal cycle engine to obtain the selected power transfer.

According to a third embodiment the present invention includes a method of operating a thermal cycle engine and an alternator to produce a power transfer from the alternator to a load during various portions of a life cycle of the thermal cycle engine. That method generally includes transferring a generally maximum obtainable power from the alternator. The method further includes determining a current of the alternator. Also, the current can be adjusted remotely from the thermal cycle engine or the alternator. In addition, a stroke of the thermal cycle engine or alternator can be determined and an optimal stroke can be selected for the thermal cycle engine or the alternator.

A fourth embodiment the present invention includes a computer program that may be executed by a processor to control either a thermal cycle engine or an alternator to obtain a power transfer. The program generally includes steps for starting the thermal cycle engine generally stall free. Moreover, the computer program is able to optimize the stroke length of at least one of the alternator and the thermal cycle engine. The computer program also optimizes a current from the alternator. Moreover, the computer program includes instructions for optimizing a heater head temperature for the thermal cycle engine to optimize the available power.

Further areas of applicability of the present invention will become apparent from the detailed description provided hereinafter. It should be understood that the detailed description and specific examples are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE VARIOUS EMBODIMENTS

The following description of various embodiments is merely exemplary and is in no way intended to limit the scope of the invention, its application, or uses. Furthermore, although the following description relates specifically to a thermal dynamic cycle engine using the Stirling cycle to produce power, it will be understood that any appropriate thermal dynamic engine may be used. For example, the invention may be equally well suited to operate and optimize a thermal dynamic cycle engine using the Brayton cycle or other appropriate thermal dynamic cycles. In addition, it will be understood that the invention may be used to optimize engines not specifically using thermal dynamic cycles but other appropriate power transfer or power production cycles.

Figure 1:
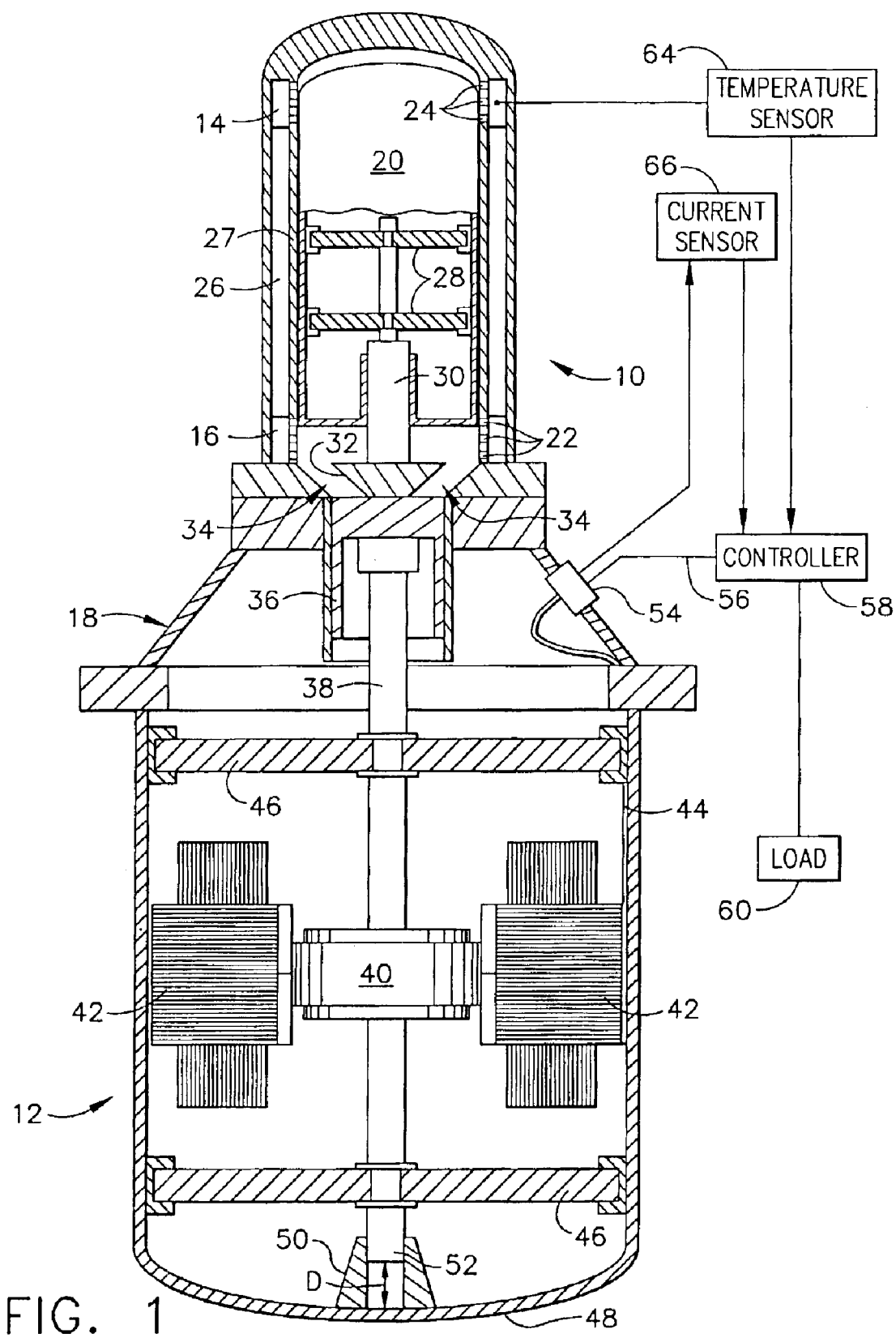
FIG. 1 is a thermal dynamic engine employing the Stirling cycle according to an embodiment of the invention.

With reference to FIG. 1, a thermal dynamic cycle engine power creation and transfer system 8 is illustrated. The system 8 includes a Stirling cycle engine 10 that is operably interconnected with an alternator 12. In this way, mechanical energy created in the Stirling cycle engine 10 can be transformed to electrical energy with the alternator 12. Again, it will be understood that any appropriate thermal dynamic cycle engine may be used in place of the Stirling cycle engine 10. In addition, any appropriate alternator may be used as the alternator 12 to provide for a conversion of the mechanical energy produced by the Stirling cycle engine 10 to electrical energy.

The Stirling cycle engine 10 generally includes a hot region or heater head 14 and a cool region 16. The heater head 14 is generally positioned adjacent a heat brick (not illustrated) and the cool region 16 interconnected with a radiator (not illustrated). The Stirling engine 10 and the alternator 12 may be interconnected and contained within a substantially continuous shell 18. It will be understood, however, that the Stirling engine 10 and the alternator 12 may be substantially individual or separate portions interconnected and joined using any appropriate means, such as welding, sealing, or otherwise. Because the shell 18 is substantially continuous and sealed, it defines a predetermined volume of gas to operate the Stirling engine 10. Moreover, it substantially seals the Stirling engine 10 and the alternator 12 from outside atmospheric gases. Generally, the gases contained within the shell 18 are those that are heated and cooled to operate the Stirling engine 10.

Although operation of the Stirling engine 10 is generally known in the art, a brief description is provided below for reference. The shell 18 of the Stirling engine 10 encloses a specific volume of gas that is able to travel around a displacer piston 20. The displacer piston 20 is positioned substantially movably sealing against walls of the Stirling engine 10 or conduits may be provided for the gas to travel around the displacer piston 20. For example, cooling end conduits 22 may be positioned adjacent the cooling section 16 of the Stirling engine 10. In addition, heating head end conduits 24 are generally positioned adjacent the heating end 14 of the Stirling engine 10. Therefore, gases may travel through the cooling end conduits 22 and heating end conduits 24 around the displacer piston 20. Generally, the gases travel through the gas transfer conduit 26 which is generally defined by an exterior or between an exterior and an intermediate wall of the Stirling engine 10.

The displacer piston 20 is held within the Stirling engine 10 by a plurality of flexure bearings or springs 28. Generally, the flexure bearings 28 allow the displacer piston 20 to oscillate or vibrate along an axis defined by the displacer rod 30. The displacer rod 30 is generally affixed or mounted to a portion of the Stirling engine 10 such that it is relatively immobile relative to the Stirling engine 10 while the displacer piston 20 may vibrate relative to the displacer rod 30. The displacer piston 20 generally forms a seal with an intermediate wall 27 of the Stirling engine 10. Therefore, the gases are forced to travel through the respective conduits 22, 24, and 26 as the displacer piston 20 vibrates relative to the displacer rod 30. Moreover, the flucture springs 28 allow for blank motion relative the displacer rod 30 but not transverse motion relative to the displacer rod 30.

As the displacer piston 20 moves axially relative to the displacer rod 30, the gases enclosed within the shell 18 move through a passage 32 as well. Generally, the gases pass through the passage 32 and compress in the compression space 34. A power piston 36 is contained generally within and substantially seals the compression space 34, therefore allowing an insignificant volume of gas to pass the power piston 36. Therefore, substantially all the force of the gas that is forced into the compression space 34 by the displacer piston 20 moves the power piston 36.

The power piston 36 is interconnected with an alternator rod 38. The alternator rod 38 is also interconnected or includes a magnetic material or portion 40. Substantially surrounding the magnetic portion 40 are a plurality of windings 42. The windings 42 are interconnected with a power transfer line 44 to allow electricity to be removed from the alternator 12. Generally, as the magnetic portion 40 vibrates along the axis relative to the windings 42, an electromotive force (emf) is created. This electromotive force is transferred through the power transfer line 44 out of the alternator 12 as a voltage.

The alternator rod 38 generally vibrates along an axis which is maintained by a plurality of flexure bearings 46 within the alternator 12. The flexure bearings 46 allow the alternator rod 38 to vibrate along an axial dimension without vibrating transversely thereto. At a closed end 48 of the alternator 12 is an additional bushing or holding member 50. This holding member 50 additionally helps hold a second end 52 of the alternator rod 38 in place. Also, the alternator rod is generally displaced a distance D from the end 48 of the alternator 12. During operation of the Stirling engine 10 which moves the alternator rod 38 in the alternator 12, the second end 52 of the alternator rod 38 moves closer to the end 48 of the alternator 12. Generally, the distance D will vary over the cycle of the Stirling engine 10. However, if the distance D becomes substantially zero or less than zero, the Stirling engine "knocks". When the Stirling engine 10 and the alternator 12 knocks, the alternator rod 38 engages or collides with the end 48 of the alternator 12. Controlling the stroke length or the load of the alternator 12, however, can minimize or eliminate the possibility of knocking.

The power line 44 is generally interconnected with a coupling 54 such that an external power line 56 is interconnected with a controller 58 (described further herein). The controller 58 is able to adapt the load being provided to the alternator 12 by the load being taken or the power being taken from the alternator 12. As described further herein, the load and current can be adjusted with the controller to optimize power transfer and operation of the system 8. The controller 58 can then determine how much power can be used for a load 60. The load 60 may include a present user load, battery, or parasitic load. In addition, various sensors such as a temperature sensor 64 and a current sensor 66 can be used by the controller 58 to determine an optimal load to be placed on from the alternator 12 to ensure for an optimal operation of the alternator 12 and the respective Stirling engine 10.

Figure 2:
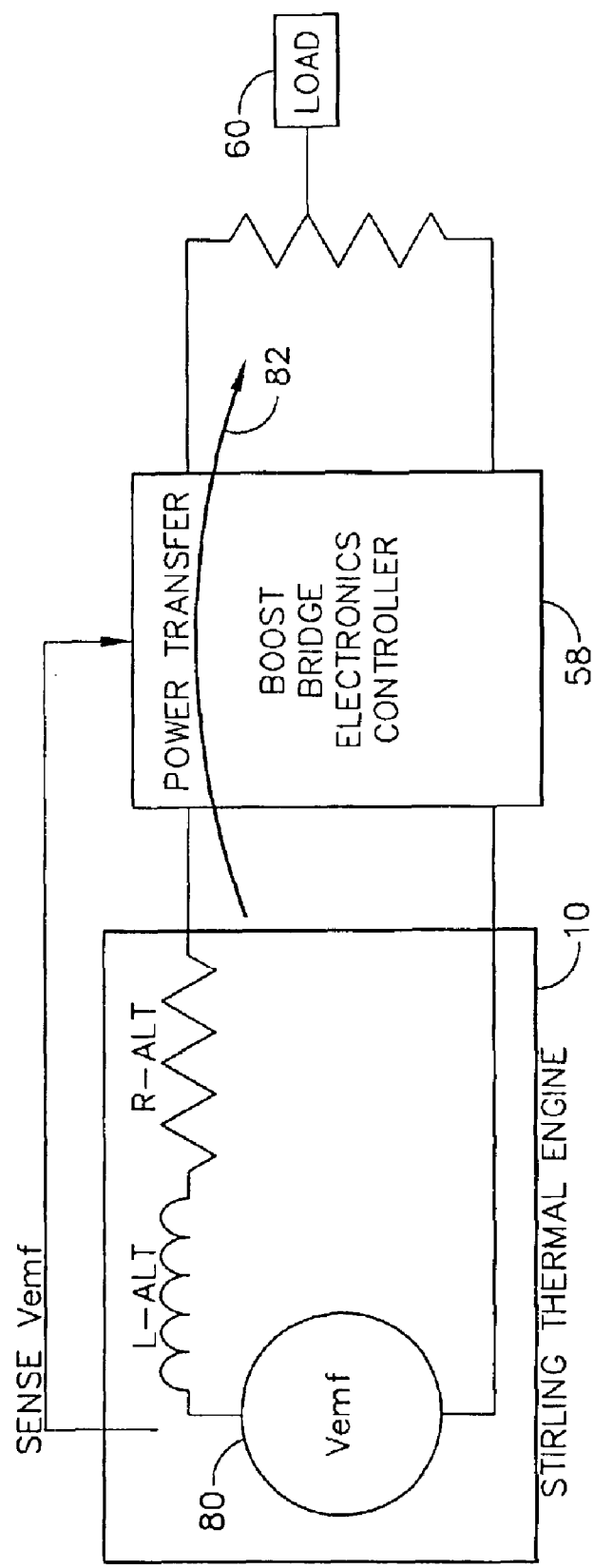
FIG. 2 is a diagrammatic view of the thermal cycle engine transferring power to a load through a boost bridge electronics control.

With reference to FIG. 2, a diagrammatic view of the system including the Stirling engine 10, the controller 58, and the load 60 is illustrated. The Stirling engine 10 in conjunction with the alternator 12 creates an electromotive force (emf) (i.e., voltage) or a voltage 80 that is represented by the term "$V_{emf}$". This $V_{emf}$, or its associated current, can be sensed with the current sensor 66 or determined by the controller 58. Because it is difficult or impossible to directly determine the $V_{emf}$, it can be determined through various techniques by the controller 58, as described further herein.

As the Stirling engine 10 and the alternator 12 create the emf, power may be transferred along line 82 to the load 60. The controller 58, as described further herein, assists in creating the most efficient power transfer 82 from the Stirling engine 10 and alternator 12 to the load 60. The most efficient or highest power transfer provides a maximum power factor. Therefore, the controller 58 can assist in increasing the efficiency of the power transfer 82 during the life and operation of the Stirling engine 10.

Figure 3:
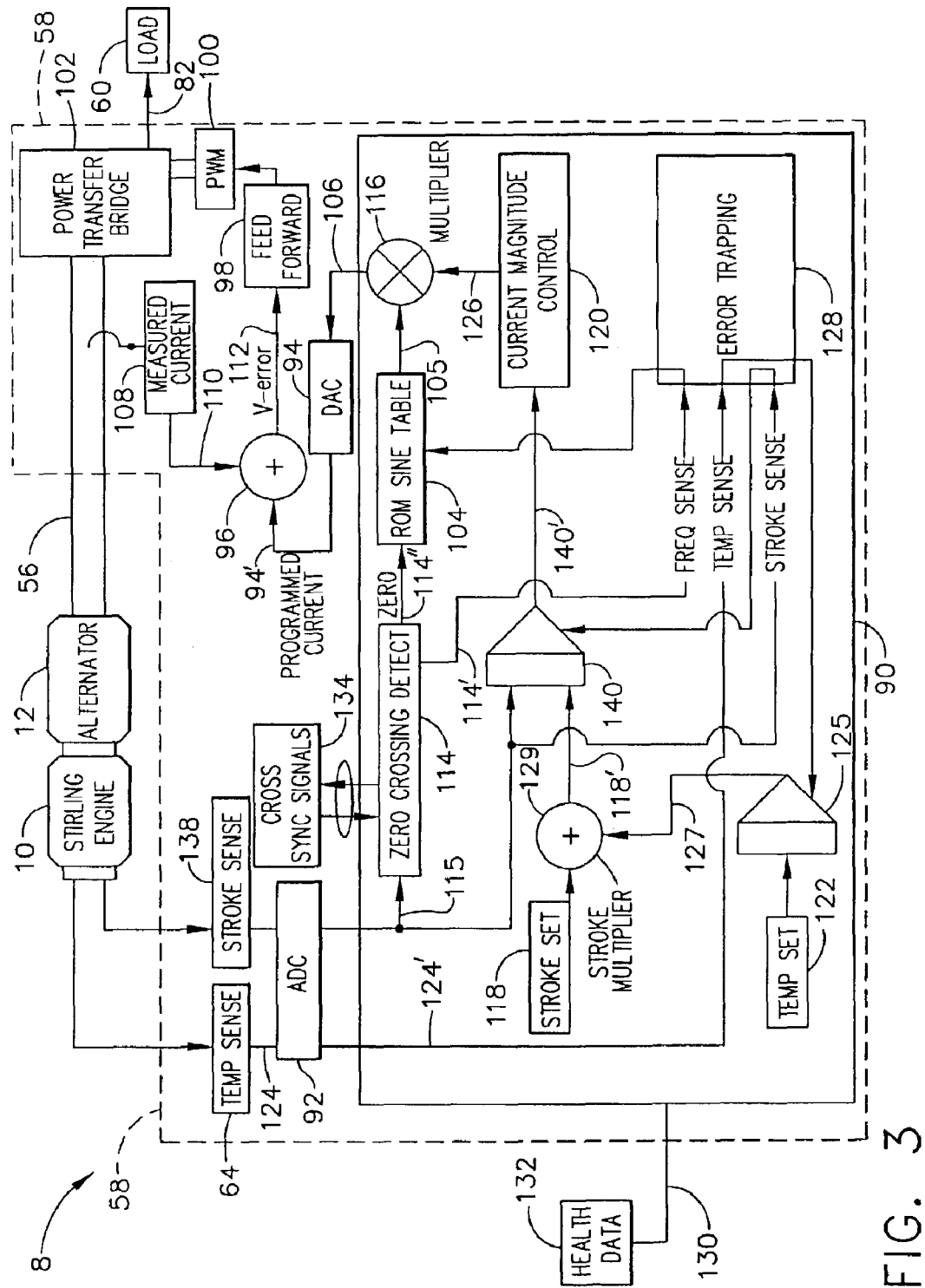
FIG. 3 is a diagrammatic view of a thermal cycle engine control system according to an embodiment of the present invention.

With reference to FIG. 1 and FIG. 3, the system for controlling the Stirling engine 10 and the alternator 12 is illustrated diagrammatically. The Stirling engine and alternator operate as a unit during operation of the Stirling engine 10 and the alternator 12 in the system 8. Therefore, it will be understood that reference to the alternator 12 alone will also refer to affecting the Stirling engine 10 because the pistons of the Stirling engine 10 operate the alternator rod 38 of the alternator 12. The controller 58 generally includes a processor 90, such as a microprocessor, an analog-to-digital converter (ADC) 92, a digital-to-analog converter 94 (DAC), an error amplifier 96, a feed forward component 98, a pulse width modulator 100, and a power transfer or boost bridge 102 (the power boost bridge 102 may be configured as a "H" and thus referred to as an "H" bridge 102). The microprocessor 90 is able to control various elements of the system to manipulate the alternator 12 and the Stirling engine 10. The "H" bridge 102 directly affects the voltage at the terminals of the alternator 12, generally the power line 56 leaving the alternator 12, to control the stroke length and other aspects of the alternator 12. The "H" bridge 102 also transfers the power to the load 60 for which the alternator 12 is producing power through the power transfer line 82.

The processor 90 is able to generally control the current, stroke, and other internal aspects of the Stirling engine 10. Each of these aspects will be discussed with reference to the processor 90 and the various components or operations thereof and further herein with program steps performed by the processor 90. Generally, the processor 90 is able to determine and correct for various physical aspects of the Stirling engine 10 and alternator 12 to achieve the maximum or most efficient power transfer 82.

The processor 90 may either have on board or access to an accessible memory table or block 104. A wave or pattern table may be stored in the memory block 104 that can be used to determine the appropriate stroke length or to determine that the stroke length is matching a predetermined wave. That is that the wave in the wave table is a selected pattern which the position of the alternator rod is to follow. Moreover, the pattern table may be matched or synchronized to a sensed stroke length or position of the alternator 12. Therefore, it will be understood that the wave stored in the memory block 104 may be any appropriate selected pattern for positions of the alternator 12 or Stirling engine 10.

The wave created and/or stored in the memory block 104, which can be accessed by the processor 90, creates an output of the wave along line 105 to a stroke calculation or multiplier block 116. The stroke multiplier 116 may then form a stroke multiplier signal 106. As described herein, a zero crossing detect block 114 synchronizes the current reference table 104 in memory block so that the sine wave table matches the frequency of the alternator 10. More specifically, the sine period and phase is synchronized to the alternator's 12 $V_{emf}$. Synchronization of the $V_{emf}$ of the alternator 12 and current of the alternator 12 or drawn into the load 60, is maintained by the signal from the stroke multiplier 116 sent to the DAC 94 along line 106, as described more fully herein.

The current of the alternator 12 is sensed or determined at measured or sensed current block 108. The $V_{emf}$ sensed is actually a pseudo emf because determining the actual emf of the alternator 12 or Stirling engine 10 is difficult. The sensed EMF can be determined by the current and known impedance of the alternator 12. The sensed current transmitted to the current error amplifier 96 along line 110. In the current error amplifier 96, the difference between the sensed current from block 108 and the programmed or selected current from the processor 90, as described further herein, is determined so that a correction can be made. The current error amplifier 96 is able to correct the difference between the sine wave stored in the memory block 104 and the sensed current of the alternator 12 in operation. The error correction or $V_{error}$ can be transmitted along line 112 to the feed forward block 98, which then transfers a signal to the pulse width modulation block 100. The pulse width modulation block 100 transforms the error correction signal into the duty cycle phase of the power transfer bridge 102. In this way, the phase of the current loading can be controlled to match the phase of the $V_{emf}$. When the phase of the current substantially matches the phase of the $V_{emf}$, then the power transfer is maximized.

Stored within the processor 90 or as a separate software program, a position zero/crossing detect sync block 114 is provided. The position zero block 114 obtains data from the analog-to-digital converter 92, which provides the position waveform of the alternator 12. The ADC 92 transmits a position signal along line 115 to the zero crossing detect block 114. The position of the alternator rod 38 can be known or determined and digitized for use by the processor 90.

The position zero block 114 can use the zero crossing signal 115 from the ADC 92, which receives the stroke sense from the Stirling engine, to provide a frequency signal 114' and a zero sync signal 114" to the sine table 104. Generally, the frequency signal 114' is transferred through an error trap 128 to initially detect and remove or eliminate obviously erroneous data or information, data not within a selected range. Nevertheless, the frequency signal 114 is then transferred to the sine table 104. In addition, the zero crossing signal 114" is also transformed to the sine table 104.

The frequency signal 114' of the zero crossing detect block 114 can be used to generate the wave table to be stored in the block 104. Meanwhile, the zero signal 114" can be used as a synchronization pointer for the wave formed in the block 104. Thus, an initial reference or start point for the wave is determined using the zero signal 114". In this way, the signal of the wave 105 from the wave table 104 is transmitted to the multiplier 116. Similarly, a current magnitude signal is transmitted from the current magnitude control block 120 to the stroke multiplier 116. The current magnitude signal 126 is multiplied against the sign table output 105 in the multiplier 116 to form the multiplier signal 106 that is transferred to the DAC 94. The DAC 94 can then produce a signal 94' that is the programmed current for the system 8. Generally, a power factor of one, the greatest power factor, is produced when the current substantially matches the $V_{emf}$ of the Stirling engine 10. Therefore, obtaining a current or current magnitude in the processor 90 produces multiplied signal 106 which is essentially the programmed current of the system related to the $V_{emf}$ or the position of the Stirling engine 10. The multiplied signal 106 from the processor 90, that is transferred to the DAC 94 provides the programmed current which is translated into the analog programmed current signal 94'.

The analog programmed current signal 94' is transmitted to the error amplifier 96. The error amplifier 96 also receives the measured current signal 110 from the current sensor 108, which measures the current from the alternator 12. The error amplifier 96 can therefore determine an error, or a $V_{error}$ that may be transferred to the feed forward block 98. Generally, if the measured current 110 is less than the programmed current 94', then a positive $V_{error}$ 112 is transferred to the feed forward block 98. However, if the measured current 110 is greater than the programmed current 94', then a negative $V_{error}$ is transferred to the feet forward block 98.

Therefore, the $V_{error}$ term 112 which is transferred to the feed forward block 98 and ultimately to the power transfer bridge 102 can help ensure that the current transferred from the alternator 12 along line 58 is substantially the programmed current 94'. This will also help ensure that the $V_{emf}$ of the alternator 12 and Stirling engine 10 are substantially equal to the current transferred through the power transfer bridge 102. Therefore, the power transfer 86 to the load 60 can be substantially maximized.

A stroke is set in stroke set block 118 so it can then be used in the Current Magnitude Control 120 to determine that the stroke is meeting the appropriate set stroke. The information from the Current Magnitude Control 120 is used in the multiplier block 116 to change the stroke of the alternator 12. The current magnitude control signal 126 is used in the multiplier 116 to change the amplitude of the wave sent from the wave table 104, via signal 105, to set the appropriate stroke of the alternator 12 via the $V_{error}$ 112 to the PWM 100. Again, as described above, the alternator 12, particularly the alternator rod 38, is connected to the pistons of the Stirling engine 10. Therefore, the stroke of the alternator 12 can be altered in conjunction with or to alter the stroke of the Stirling engine 10. Nevertheless, the selection of the stroke of the alternator 12 assists in producing the maximum power transfer 82.

The system 8 allows for both current control of the alternator 12 and position control or stroke control of the alternator 12. In addition, because the Stirling engine 10 is a thermal engine providing thermal control of the environment in which the Stirling engine 10 is placed may also be advantageous. Generally, although known in the art, the hotter the hot end 14, and particularly the difference in temperature of the hot end 14 from the cool end 16, the greater the power generated by the Stirling engine 10. Therefore, controlling the hot end 16 to obtain a maximum heat or optimum heat can be used to provide for maximum power output by the Stirling engine 10.

Therefore, a temperature set point block 122 can be provided to determine or set a desired temperature for the hot section 16. The temperature sensor 64 transmits a signal along line 124 to the ADC 92. It will be understood that a single ADC 92 can be used to convert the analog signals from both the position sensor and the temperature sensor 64 to digital signals that can be read by the processor 90, or a single ADC 92 may be provided. Nevertheless, a digitized temperature signal 124' is transferred to the error trapping block 128 to first remove any obviously erroneous data. The error trapping block 128 verifies that the temperature signal 124' is within the expected limits. If outside the limits, then a decision can be made to perform a recovery. After this, the digitized temperature signal 124' is transferred to a temperature calculation/validation block 125. Here the sensed temperature from the temperature sensor 64 can be calculated and validated and compared to the temperature of the temperature set point in block 122.

The information from the temperature calculation validation block 125 can be transferred along line 127 to a stroke multiplier block 129. The stroke set point block 118 can then determine the appropriate stroke set point for the temperature that is sensed from the temperature sensor 64. The stroke set point can use the information from the temperature sensor 64 to obtain or achieve the desired temperature set point selected in temperature set point block 122. Therefore, the stroke set point 118, which can be produced with the processor 90, is selected in part depending upon the temperature of the hot end 14 of the Stirling engine 10 sensed by the temperature sensor 64.

Each stroke of the Stirling engine 10 removes heat from the hot section 14 of the Stirling engine 10. Therefore, changing the stroke, either the frequency or the length, can change the amount of heat removed from the hot section 14 of the Stirling engine 10. Therefore, the temperature set point can be obtained by changing the stroke of the Stirling engine 10 or the alternator 12. The temperature calculation from block 125 is transferred to the stroke set point calculation block 118 to be included in determining the appropriate stroke for the alternator 12. Again, this signal can be sent to the current magnitude control block 120 to adjust to the wave of the Sine Table block 104 to control the stroke of the alternator 12. In this way, the processor 90 can be used to determine, set, and alter the current, position or stroke, and temperature of the Stirling engine 10 or alternator 12.

Furthermore, the information collected with the processor 90 can be transferred along line 130 to a display or monitoring instrument 132. The instrument 132 can be used to monitor the health data, including the temperature, pressure, power transfer, and other information regarding the Stirling engine 10 and alternator 12. The monitoring instrument 132 may be automated or reviewed by an individual.

Although the processor 90 and the related controller 58 can be used to generally control the single Stirling engine 10 or alternator 12, it will be understood that two Stirling engines 10 may be provided opposed to one another. Providing two opposed Stirling engines allows vibration due to the stroke of the Stirling engine 10 or the alternator 12 to be canceled. Therefore, a zero crossing sync signal cable or system 134 can be provided to transfer a zero-crossing sync signal to the processor 90, and particularly to the position zero crossing detect sync block 114. In this way, it can be assured that both of the engines that are opposed to one another are in substantial sync so that overall or total vibration of the engines are substantially canceled. Also, if an engine temperature or stroke sensor fails, the failed engine can be lock stepped with the good engine with a high probability of success by operating the same stroke/temperature.

With reference to FIG. 3, the processor 90 can include hardwired or software programming to carry out the various steps described to be within the processor 90 above. The programming for the microprocessor includes several different subprograms or components. One component of the processor 90 and the controller 58, as a whole, is to select or control the current from the alternator 12. Controlling the current through the H-Bridge 102 also controls the stroke length due to the varied load and thus vary the stress on the alternator 12.

The controller 58 can be used to control the current, particularly the current load, form the alternator 12. As a part of controlling the current the stroke frequency and zero-crossing or sync point are sensed in block 114. After the sensed Stroke's frequency and time sync are measured in block 114, the frequency signal 114' and sync signal 114" are sent to update the Sine Table in block 104. The stroke control loop (described herein) through block 118 and current magnitude control block 120 produce a new current command signal 126 which is sent to the stroke multiplier/scaler block 116. The DAC 94 provides a programmed current to compare with the actual Measured Current signal 110. The $V_{error}$ amplifier 96 can then transmit the $V_{error}$ signal 112 to the pulse width modulation block 100 to correct or select the appropriate current transmitted through the "H" bridge 102.

Therefore, the current control loop or component can determine or select the appropriate current being transmitted from the alternator 12 through the "H" bridge 102. The current control loop can occur at any appropriate frequency and generally may occur at between about one and about one hundred microseconds. Therefore, this can allow for substantially continuous control of the current from the alternator 12.

Figure 4:
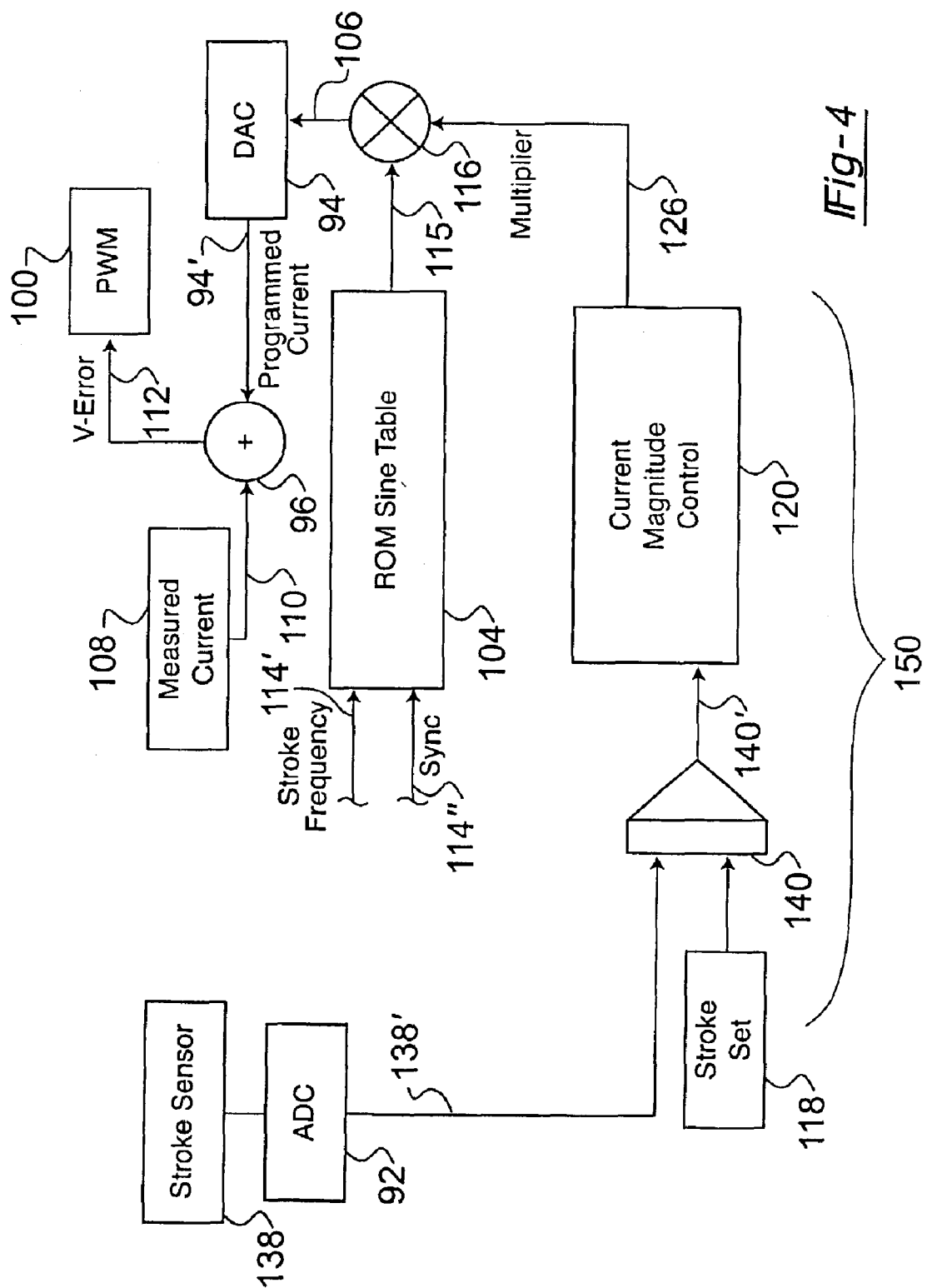
FIG. 4 is a diagram of a stroke sensing and control system for controlling the thermal dynamic engine.

With reference to FIG. 4, a diagram illustrates generally a stroke control or loop program 150. The stroke control loop program 150 starts with a signal from a stroke sensor 138. The signal is transferred through the ADC 92 which forms a digital stroke sense signal 115 that is then transferred to a stroke integrator or calculator 140. The set stroke is input in block 118 and also transferred to the integrator 140 The integrator 140 compares the desired stroke or set stroke 118 and produces a stroke error signal 140' that is transferred to the Current Magnitude Control 120. The output of block 120, a current magnitude signal 126, is sent or transferred to the stroke multiplier 116. This provides the current command scaling signal 106. The multiplied signal 106 is converted to analog with the DAC 94 and a programmed current signal 94' is compared to the measured current to produce a $V_{error}$ term 112 that is transferred to the PWM 100 (FIG. 3).

The PWM 100 alters the H-bridge 102 to place the selected current load on the alternator 12. The current load moves the stroke to the desired value. This is the optimal stroke for any given time in the life of the alternator 12 or Stirling engine 10 or dependent on the temperature detected from the temperature sensor 64.

The stroke control component 150 also determines the present stroke in the wave table 104 as discussed above. The wave signal 105 from the wave table 104 is transmitted to the stroke multiplier 116 to select the amplitude or magnitude of the wave signal 106 transmitted to the DAC 94. It is the current magnitude control block 120 that determines or selects the current that is transmitted from the alternator 12. Therefore, changing the stroke through block 140 and thus modifying the Current Magnitude Control output 126 can be used to correct or change the stroke of the alternator 12 using the error amplifier 96.

Thus, the stroke control program 150 transmits an error correction or wave signal 106 and converted to linear signal by 94' and then to the error amplifier 96 to select the appropriate stroke of the alternator 12. The stroke control loop 150 can determine the stroke presently occurring in the alternator 12 and determine whether an error correction value is required to be transmitted to change the stroke of the alternator 12 to achieve the selected stroke set point in block 118. The integrator 140 combines the sensed stroke signal 115 and the stroke set point 118 to provide a collection signal 140' to the current control block 120 to be compared to the sine table 104 to select an appropriate current to be drawn.

Figure 5:
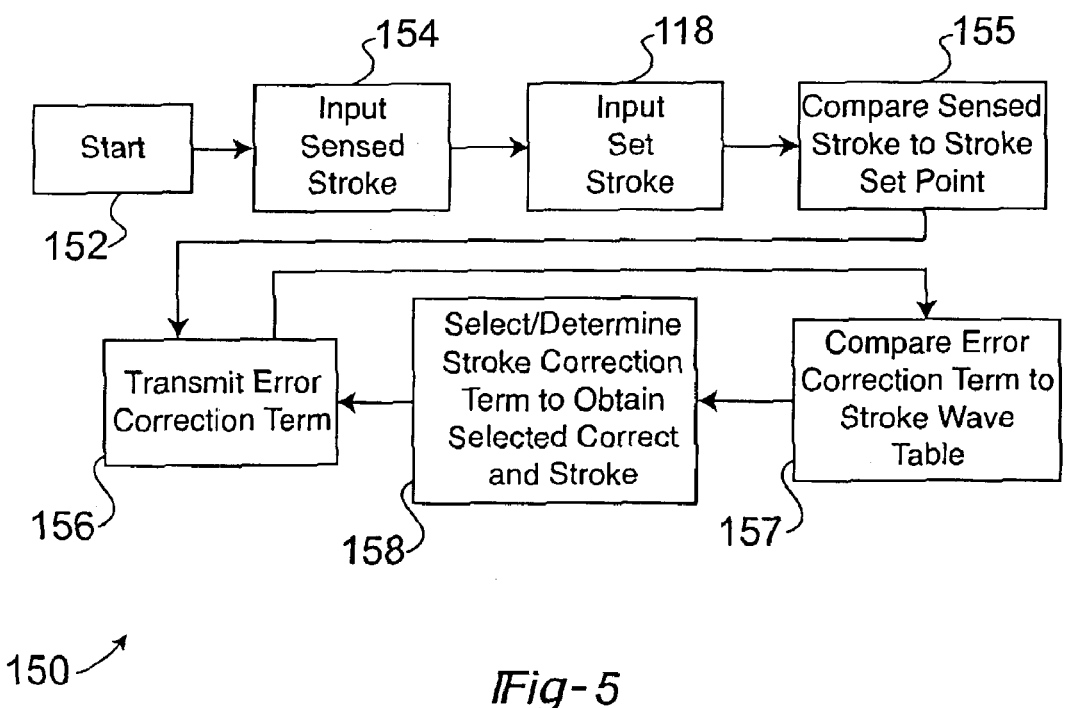
FIG. 5 is a flow chart of a stroke sensing portion of a program to control the thermal dynamic engine.

With continuing reference to FIG. 4 and additional reference to FIG. 5, a system or general program outline can be selected without particular reference to selected components of the system. Therefore, it will be understood that the various components are mainly exemplary and the steps can be often varied to obtain the selected result. Nevertheless, the stroke control program 150 generally follows the steps beginning in the start block 152.

A sensed stroke signal is input in block 154 and is then compared to a set stroke in block 156. The set stroke is input in block 118 between the input of the sensed stroke and comparing the sensed stroke to the stroke set point. For example the integrator 140 can be used to determine the difference between the sensed stroke and the stroke set point and can be transmitted to the current magnitude control block 120. As discussed above and further herein, the stroke set point can be selected depending upon the temperature of the heater head and various other selected properties of the system 8.

After comparing the sensed stroke to the stroke set point in block 155, an error correction, such as the error signal 140', can be transmitted in block 156 to a selected component, such as the current magnitude control block 120. The error correction term can then be compared to a stroke wave table or stroke pattern table. This comparison allows a determination of the current stroke position and frequency relative to the selected stroke and a selected current. Therefore, in the selection or determination block 158, a selected stroke can be determined or selected for operation of the alternator 12. This determined or selected stroke can be transmitted as an error term to alter the current load placed on the alternator to achieve the selected stroke. Nevertheless, the stroke control program 150 can be carried out with the components described in reference FIG. 4 and with the steps described in the program in FIG. 5.

Figure 6:
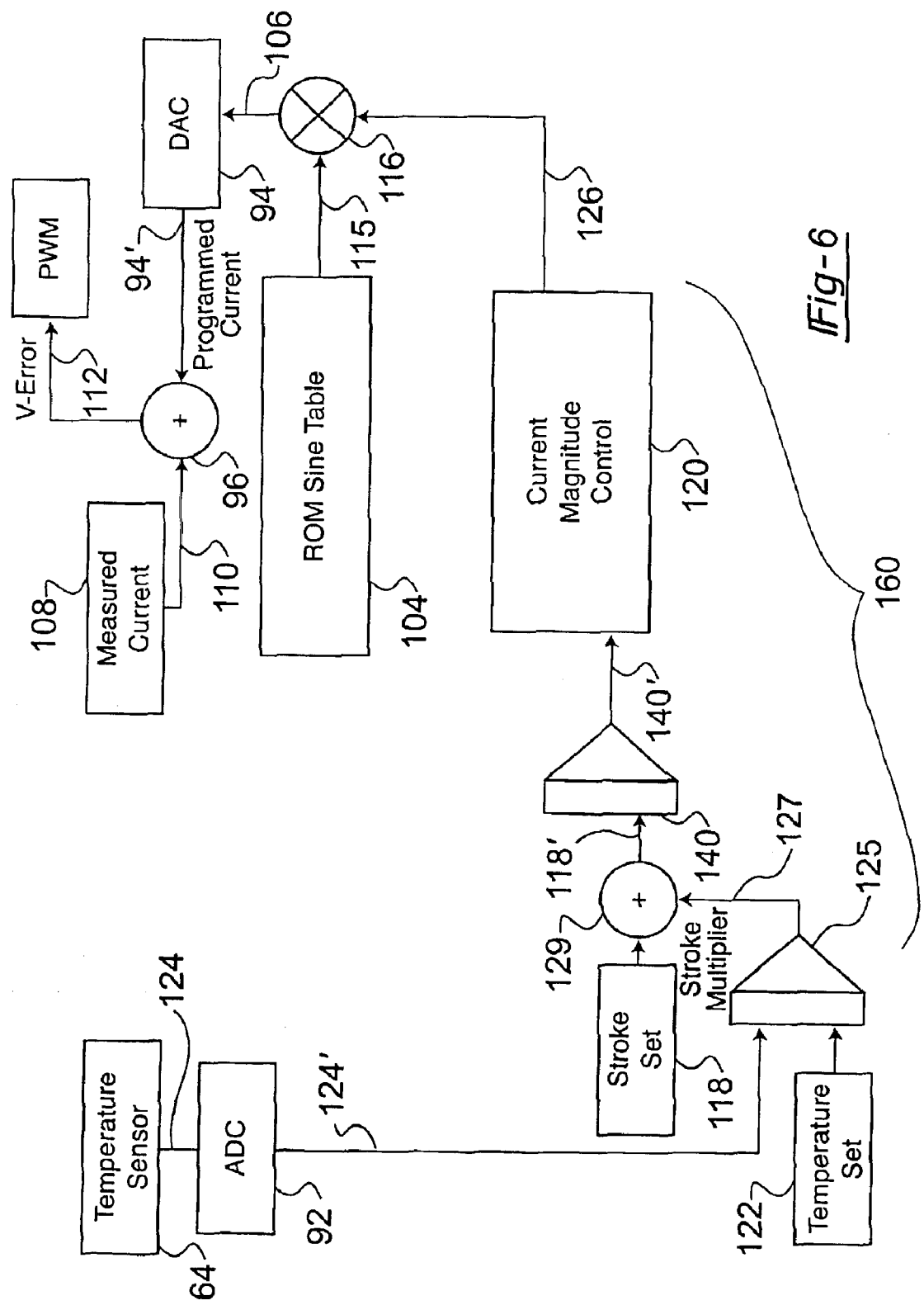
FIG. 6 is a diagram of a temperature sensing and control system for controlling the thermal dynamic engine.

With reference to FIG. 6, a thermal control loop program 160 is illustrated in diagrammatic form. As illustrated in the temperature control program 160, various portions of controlling the temperature are similar to portions of controlling the stroke. As described above, the temperature of the hot portion 14 of the Stirling engine 10 is at least partly dependent upon the stroke of the Stirling engine. As discussed, and generally known in the art, operation of the Stirling engine 10 requires a heat differential and each stroke of the engine effectively removes heat from the hot end 14. Controlling the stroke is also a portion of controlling the temperature and cooling the temperature also requires control of the stroke.

Therefore, the stroke control program 150 can be a separate stroke control portion of the control system for controller 58 and also be an integral portion of the temperature control program 160. The above discussion relates to how the stroke is sensed and controlled alone while the following discussion, with reference to FIG. 6, describes temperature control as a way to control the stroke initially which is then carried out by the stroke control program 150. It will be understood, however, that the temperature control program 160 can also be a separate program to only control the temperature of the Stirling engine 10.

The thermal control program 160 includes an input of the temperature set point 122. The temperature set-point 122 is transferred to a temperature integrator block 125. The temperature integrator block 125 also receives a digitized temperature signal 124'. The digitized temperature sensor signal 124' comes from the temperature sensor 64 which transmits a temperature sensed signal 124 to the ADC 92. The calculated or compared temperature is then transferred to the temperature/stroke multiplier 129. In the temperature/stroke multiplier 129, the stroke set point 118 can be altered depending upon the temperature signal 127 from the temperature integrator 125. The difference between the set temperature 124' and a temperature set-point 122, determined in the temperature integrator 125, is transferred to a temperature/stroke multiplier 129.

In the temperature/stroke multiplier 129 the stroke set-point 118 is altered depending upon the difference between the sensed temperature 124' and the temperature set-point 122. As discussed above, the stroke can be altered to achieve a selected temperature. Therefore, the stroke set point 118 is augmented in the temperature/stroke multiplier 129 to achieve an augmented set stroke set point 118'. The augmented stroke set point 118' can then be transferred to the stroke integrator 140. The integrator 140 also receives signals from the stroke sensor 138, as described above, to alter the stroke of the alternator 12. Therefore, the remaining portions of the temperature control program 160 are substantially identical to the stroke control program 150. Nevertheless, rather than receiving an unaltered stroke set point 118 into the integrator 140, the temperature control program 160 alters the stroke set point 118 to form an altered or temperature sensitive stroke set point 118' to control the stroke of the alternator 12.

Thus, the selected stroke set point in block 118 can be augmented to achieve the temperature set point in block 122. Generally, the temperature set point at block 122 is an optimal temperature for operation of the Stirling engine 10. As is generally known, the Stirling engine 10 can be tuned to operate optimally at a selected temperature. Therefore, the temperature set point at block 122 is the optimal temperature for operation of the Stirling engine 10. As discussed above, altering the stroke alters the temperature of the hot end 14 by increasing or decreasing the rate of thermal energy removed.

Therefore, the current can be controlled with the controller 58, as described above, the stroke is controlled with the stroke control program 150, and the temperature controlled with the temperature control program 160. Each of the individual programs or components can be carried out completely or with the assistance of the by the processor 90, to achieve maximum power transfer 82 from the alternator 12 to the load 60. Nevertheless, the programs or controls may be at least partly analog. For example, the current control component generally includes the current sensor 108 and the error amplifier 96. Although the error amplifier 96 may obtain an error factor signal or programmed current 94' from the processor 90 the current control loop is substantially analog in controlling the current of the system 8.

The system 8 can also be synchronized by developing the pseudo $V_{emf}$ from the known or sensed current and known source impedance of the alternator 12. That is, that the impedance for the alternator 12 is known and the current from the alternator 12 can be measured with the sensor 108. In this way, the pseudo $V_{emf}$ can be determined for synchronization of the wave table in the memory block 104 with the alternator 12.

Figure 7:
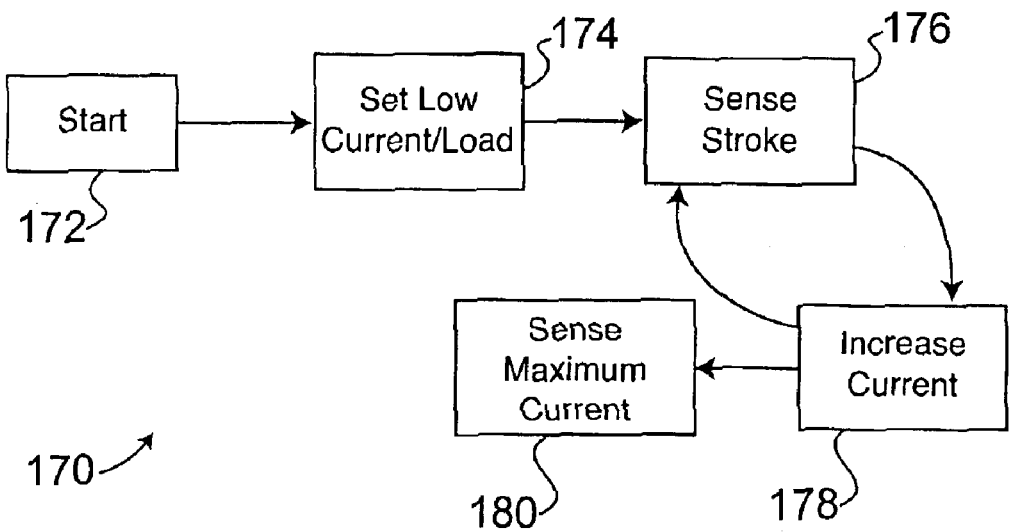
FIG. 7 is a flow chart of a start-up operation to control the thermal dynamic engine.

The various programs or components, including the current control component, the stroke control program 150, and the temperature control program 160 can be used to optimize a start-up operation of the Stirling engine 10. More particularly, the processor 90 is used to control the current drawn from the alternator to ensure a substantially stall-free start-up. An exemplary start-up procedure 170 is illustrated in a flow chart in FIG. 7. The start-up program 170 may be either inherent in the system or distinct program instructions. In either case, the current control component, stroke control program 150, and temperature control program 160 help ensure the stall-free start-up.

The start up operation 170 begins with a start block 172. During start-up, the load put on the alternator 12 can be minimized to allow for a maximum stroke of the alternator 12 to be achieved. The current control component and the stroke control programs 150 inherently achieve this by selecting a current to match the small stroke.

The current magnitude control block 120 can be used to set a low current in block 174. The low current will allow for a maximum stroke of the alternator 12 to be achieved before increasing the current load. That is, that the lower the current being drawn from the alternator 12, the greater the stroke allowed of the alternator 12. Nevertheless, reaching the knocking stroke may damage the alternator 12. Thus the stroke is controlled to substantially not reach or stop just short of the knocking stroke. Therefore, at the lower loads the stroke can almost reach the knocking stroke even though the Stirling engine is at low power, that is when the temperature of the heater head 14 is not substantially hot or has not yet reached the optimum operating temperature, without causing the Stirling engine 10 to stall.

After the current is set to the lowest current in block 174, the stroke can be sensed in block 176. The sensing of the stroke in block 176 ensures that the stroke of the alternator rod 38 is achieving a desired or maximum stroke without knocking. As the stroke is sensed in block 176 to nearly be reaching the knocking stroke length, the current can be increased in block 178 with the current control component. Increasing the current load on the alternator 12 reduces the immediate stroke of the alternator 12. The greater the current transferred to the load 60, the more tension or stress placed on the alternator 12, thereby limiting the stroke of the alternator rod 38. This can continue during the start-up until the Stirling engine 10 has reached maximum power or the heater head has reached the optimum operating temperature. That is, sensing the stroke of block 176 and increasing the current in block 178 can be iterated until a maximum current is reached in block 180. When the maximum current is reached in block 180, the stroke of the alternator 12 has reached a maximum point at a maximum current that can be placed on the alternator 12. At this point, the Stirling engine 10 is operating at maximum efficiency.

The start program 170 and the processor 90 allows the alternator 12 to be minimally loaded, to allow a maximum stroke to be achieved for each temperature step of the heater head 14 of the Stirling engine 10. During start up of the Stirling engine 10, the hot side 14 is generally not much hotter than the cool side 16. Therefore, the temperature differential across the Stirling engine 10 is not that great. Therefore, the power produced by the Stirling engine 10 is only minimal. At this time, the load, which can be placed on the alternator 12 without collapsing the $V_{emf}$ is minimal. If too great a load is placed on the alternator 12, the $V_{emf}$ of the Stirling engine is collapsed and the Stirling engine 10 stalls. Therefore, the control performed by the processor 90 can be used to assure that start-up of the Stirling engine 10 is achieved without collapsing the $V_{emf}$.

The processor 90 may also include a block for anticipating a long time constant, such as temperature increase and stroke length. That is that the ability to change the temperature of the hot end 14 of the Stirling engine 10 is limited by the ability of the Stirling engine 10 to transfer the thermal energy to the cool end 14. Moreover, the time differential between sensing the temperature and determining the temperature within the processor 90 includes a time delay. Therefore, the processor 90 may include a set of anticipated measurements that will be reached by the Stirling engine 10 over the start-up period depending upon various known variables. In this way, the processor 90 can be used to carry out the various programs, including the current control loop, the stroke control loop 150, and the temperature control loop 160, to achieve the maximum power transfer 82 over the entire life of the Stirling engine 10.

As the Stirling engine 10 is first brought on line or started under the processor 90 control, the Stirling engine 10 is maintained in the running or power producing operation without collapsing the $V_{emf}$. Therefore, additional resources are not wasted in attempting to restart the Stirling engine 10 from a non-optimal position. Moreover, the processor 90, can account for many variations of variables, such as the temperature and the stroke length. Therefore, the processor 90, can account for many variations to achieve a non-stalling start up of the Stirling engine 10. Thus, the processor 90 can assure a reliable start up of the Stirling engine 10. The importance of providing a successful start-up of the Stirling engine 10 can be appreciated when it is being employed in a non-accessible location, such as a satellite or space craft.

Moreover, including the various programs, including the current control loop, the stroke control loop 150, and the temperature control loop 160, the power transfer 82 can be optimized over the life of the Stirling engine 10. Simply, the temperature of the Stirling engine 10 and other efficiencies can change over the lifetime of the Stirling engine 10. Nevertheless, the microprocessor 90 can be used to alter the temperature of the hot portion 14 of the Stirling engine 10 to achieve maximum efficiency or power transfer from the alternator 12 to the load 60. Rather than simply allowing the Stirling engine 10 to decrease power transfer 82 over its lifetime, the power transfer 82 can be maximized by changing the stroke of the alternator 12 and the Stirling engine 10 to achieve maximum power transfer 82 at any point for the Stirling engine 10.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A system for controlling a thermal cycle engine powering an alternator to produce a power transfer, comprising:
   a processor able to carry out a set of instructions;
   a current sensing subsystem for sensing a current flowing through a current sensor to determine a $V_{emf}$; and
   an error amplifying subsystem;
   a temperature sensor to sense the temperature of a portion of the thermal cycle engine; and
   a position sensor to sense the position of at least one of the thermal cycle engine and the alternator;
   wherein said processor controls said error amplifying module depending upon the temperature in the position of the thermal cycle engine or the alternator to achieve a selected power transfer from the alternator to a load;
   wherein said processor is able to control said error amplifying module to provide a load current that is substantially of the same wave shape and phase of the $V_{emf}$ of the thermal cycle engine to achieve a selected power transfer from the alternator.

2. A system for controlling a thermal cycle engine powering an alternator to produce a power transfer, comprising:
   a processor able to carry out a set of instructions;
   a current sensing subsystem for sensing a current flowing through a current sensor to determine a $V_{emf}$; and
   an error amplifying subsystem;
   a zero crossing link signal to said processor such that said processor can operate the thermal cycle engine synchronously with a second thermal cycle engine;
   wherein said processor is able to control said error amplifying module to provide a load current that is substantially of the same wave shave and phase of the $V_{emf}$ of the thermal cycle engine to achieve a selected power transfer from the alternator.

3. A system for efficiently producing electrical power, comprising:
   a thermal cycle engine;
   an alternator driven by said thermal cycle engine;
   a load to consume electrical power produced by said alternator; and
   a digital controller for controlling at least a portion of at least one of said thermal cycle engine and said alternator to provide power transfer from said alternator to said load;
   wherein said controller is able to control a stroke length of said alternator to obtain a selected power transfer from said alternator;
   said controller is able to alter the consumption of electrical power from said alternator with said load during difference phases of a life cycle of said thermal cycle; and
   said load is generally lower at a beginning of said life cycle and higher at a intermediate portion of said life cycle.

4. A method of operating a thermal cycle engine and an alternator to produce a power transfer from the alternator to a load during a life cycle of the thermal cycle engine, comprising:
   transferring a generally maximum attainable power from the alternator;
   determining a current of the alternator with a processor;
   adjusting said current remotely to the thermal cycle engine;
   determining a stroke length of the thermal cycle engine; and
   selecting an optimal stroke length for the thermal cycle engine or the alternator;
   starting the thermal cycle engine substantially stall free;
   wherein the step of transferring a generally maximum obtainable power from the alternator includes transferring an amount of power less than an amount required to stall the thermal cycle engine; and
   wherein selecting a stroke includes selecting a stroke generally less than the knocking stroke to remove the maximum amount of power.

5. The method of claim 4, wherein starting the thermal cycle engine includes:
   determining said stroke a plurality of times; and
   adjusting said current prior to said determined stroke reaching said knocking stroke.

6. A computer program executed by a processor to control either a thermal cycle engine or an alternator to obtain a power transfer from the alternator, the program comprising:
   starting the thermal cycle engine generally stall free;
   optimizing a stroke length of at least one of the alternator and the thermal cycle engine;

optimizing a current from the alternator; and optimizing a heater head temperature of the thermal cycle engine; wherein optimizing a current from the alternator includes;

reading a wave table stored in a computer accessible memory;

determining a error correction value to achieve a optimum current from the alternator;

providing the error correction value to a analog system to provide a feed forward signal such that the next cycle of detected current substantially matches the wave table.

7. The computer program of claim 6, wherein starting the thermal cycle engine includes:

selecting a load to achieve a maximum stroke length at the start-up of the thermal cycle engine.

8. The computer program of claim 7, wherein:

said load is selectable as said stroke length generally reaches a knocking stroke length;

said computer program controls an analog source to increase a load on the alternator to reduce the current stroke length.

9. A computer program executed by a processor to control either a thermal cycle engine or an alternator to obtain a power transfer from the alternator, the program comprising:

starting the thermal cycle engine generally stall free;

optimizing a stroke length of at least one of the alternator and the thermal cycle engine;

optimizing a current from the alternator; and optimizing a heater head temperature of the thermal cycle engine;

wherein optimizing a heater head temperature includes;

calculating a current temperature of the heater head;

checking the calculated current temperature with a stored optimal temperature of the heater head; and optimizing a stroke length to substantially equalize said sensed temperature and said stored selected temperature.

10. The computer program of claim 9, wherein a longer stroke length cools said heater head.

* * * * *